United States Patent
Tanaka

(10) Patent No.: US 7,496,704 B2
(45) Date of Patent: Feb. 24, 2009

(54) INFORMATION PROCESSING DEVICE WITH DISPLAY HAVING ATTACHABLE/DETACHABLE DATA STORAGE DEVICE HAVING A PLURALITY OF RECORDING MEDIA

(75) Inventor: Dai Tanaka, Shiojiri (JP)

(73) Assignee: Seiko Epson Corporation (JP)

( * ) Notice: Subject to any disclaimer, the term of this patent is extended or adjusted under 35 U.S.C. 154(b) by 280 days.

(21) Appl. No.: 11/462,135

(22) Filed: Aug. 3, 2006

(65) Prior Publication Data

US 2007/0033344 A1    Feb. 8, 2007

(30) Foreign Application Priority Data

Aug. 5, 2005  (JP) .............................. 2005-227570
Jul. 13, 2006  (JP) .............................. 2006-192675

(51) Int. Cl.
  *G06F 12/00*  (2006.01)
  *G06F 13/00*  (2006.01)
(52) U.S. Cl. ............................. 710/74; 710/61; 710/62; 710/72; 710/73; 711/115; 711/116; 711/117
(58) Field of Classification Search .................. 710/61, 710/62, 72–74; 711/115–117
See application file for complete search history.

(56) References Cited

U.S. PATENT DOCUMENTS

| 5,437,012 | A  | * | 7/1995 | Mahajan ...................... 711/111 |
| 6,132,315 | A  | * | 10/2000 | Miyamoto et al. ............ 463/43 |
| 6,338,680 | B1 | * | 1/2002 | Connors ....................... 463/43 |
| 6,729,549 | B2 | * | 5/2004 | Hamann et al. ............. 235/492 |
| 6,889,329 | B1 | * | 5/2005 | DiGiorgio et al. .............. 726/9 |

FOREIGN PATENT DOCUMENTS

JP        2002-222391        8/2002

* cited by examiner

*Primary Examiner*—Tammara Peton
(74) *Attorney, Agent, or Firm*—Harness, Dickey & Pierce, P.L.C.

(57) ABSTRACT

An information processing device includes: an interface to/from which a recording medium is attachable/detachable; a data storage device that stores data; a data extractor that extracts data recorded on the recording medium connected through the interface, with the data maintained in a data configuration of the recording medium; and a controller that controls the data storage device to store the data extracted by the data extractor together with an identifier which specifies the recording medium, with the data maintained in the data configuration extracted.

6 Claims, 6 Drawing Sheets

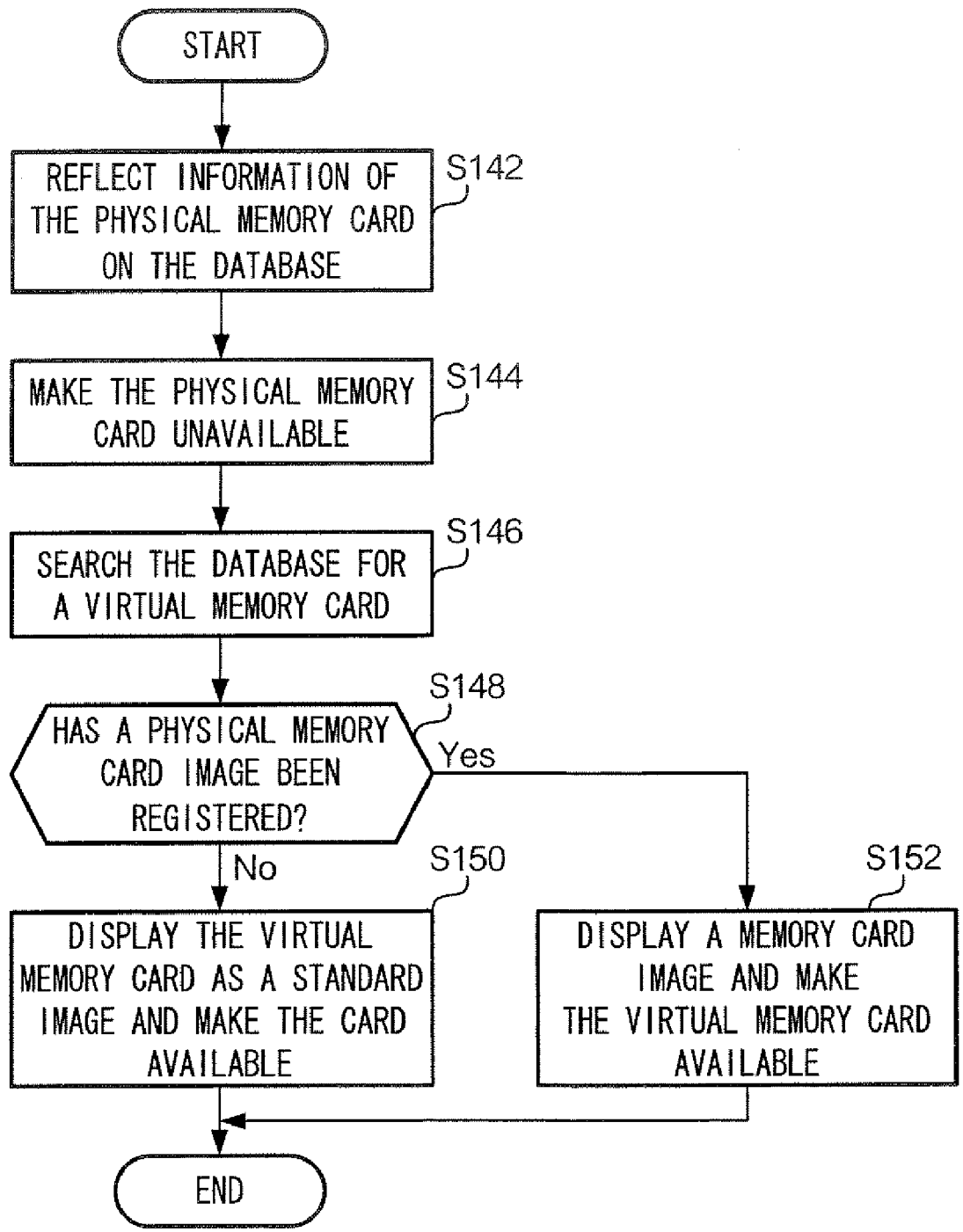

INFORMATION PROCESSING DEVICE WITH DISPLAY HAVING ATTACHABLE/DETACHABLE DATA STORAGE DEVICE HAVING A PLURALITY OF RECORDING MEDIA

The entire disclosure of Japanese Patent Applications No. 2005-227570, filed on Aug. 5, 2005, and No. 2006-192675, filed on Jul. 13, 2006 are expressly incorporated by reference herein.

BACKGROUND

1. Technical Field

The present invention relates to a technique for processing data in an information processing device to/from which a recording medium is attachable/detachable.

2. Related Art

In recent years, recording media such as memory cards for recording various data are used in computers and audio/visual devices in a variety of situations. Since recording media of this kind are portable, data can be interchanged with ease between plural devices. Therefore, one user is now likely to frequently use different recording media.

A technique which facilitates handling of plural recording media is disclosed in, for example, JP-A-2002-22391.

However, a memory card management device according to JP-A-2002-222391 requires plural memory card slots for fixing and electrically connecting memory cards. Hence, there arise difficulties in downsizing a memory card device. If more memory cards than a number of memory card slots are owned, those memory cards that cannot be attached to the memory card management device have to be handled in the same manner as is conventionally required. In other words, a user needs to replace memory cards to be attached to the memory card slots. Consequently, management of data recorded in the memory cards is complex if a large quantity of memory cards exists.

In contrast, the invention provides a technique for managing plural memory cards with ease.

SUMMARY

According to an aspect of the invention, an information processing device includes: an interface to/from which a recording medium is attachable/detachable; a data storage device that stores data; a data extractor that extracts data recorded on the recording medium connected through the interface, with the data maintained in a data configuration of the recording medium; and a controller that controls the data storage device to store the data extracted by the data extractor together with an identifier which specifies the recording medium, with the data maintained in the extracted data configuration extracted. This image forming device allows easy management of plural storage media.

It is preferable that the information processing device may further includes data synchronizer that synchronizes at least part of the data in the recording medium connected through the interface, with at least part of the data that corresponds to the storage medium among data stored in the data storage device. Alternatively, it is preferable that the information processing device may further includes data synchronizer that synchronizes at least a part of data that corresponds to the storage medium among data stored in the data storage device, with at least a part of data in the recording medium connected through the interface. These information devices are each capable of synchronizing data stored in a storage medium with data stored in the data storage device of the information processing device.

It is preferable that the information processing device may further includes: image storage device for storing image data linked to the extracted data stored in the data storage device by the controller and to the identifier specifying the recording medium; and a display that displays the image data stored in the image storage device. This image processing device is capable of showing a user that the extracted data stored in the data storage device and the recording medium are available.

It is preferable that the information processing device may be configured such that the data storage device stores data corresponding to a plurality of recording media, and the information processing device further comprises image updater that updates the image data that corresponds to the recording medium connected through the interface among the image data stored in the image storage device, to image data indicating that the recording medium is now attached. This information processing device is capable of showing a user that the extracted data stored in the data storage device and the recording medium are available.

It is preferable that the information processing device may be configured such that the recording medium is a card type recording medium. This information device allows easy management of plural card type storage media.

According to another aspect of the invention, a data processing method for an information processing device having an interface to/from which a recording medium is attachable/detachable, and data storage device for storing data, the method including: extracting data recorded on the recording medium connected through the interface, with the data maintained in a data configuration of the recording medium; and controlling the data storage device so as to store the extracted data together with an identifier specifying the recording medium, with the data maintained in the extracted data configuration. This data processing method allows easy management of plural storage media.

According to still another aspect of the invention, a recording medium storing a program executable by an information processing device having an interface to/from which a recording medium is attachable/detachable, and data storage device that stores data, the program including: extracting data recorded on the recording medium connected through the interface, with the data maintained in a data configuration of the recording medium; and controlling the data storage device so as to store the extracted data together with an identifier specifying the recording medium, with the data maintained in the extracted data configuration. This program also allows easy management of plural storage media.

BRIEF DESCRIPTION OF THE DRAWINGS

The invention will be described with reference to the accompanying drawings, wherein like numbers reference like elements.

FIG. 5 is a flowchart showing details of memory card mount processing.

DESCRIPTION OF EXEMPLARY EMBODIMENTS

1. Configuration of Information Processing Device 1

Figure 1:
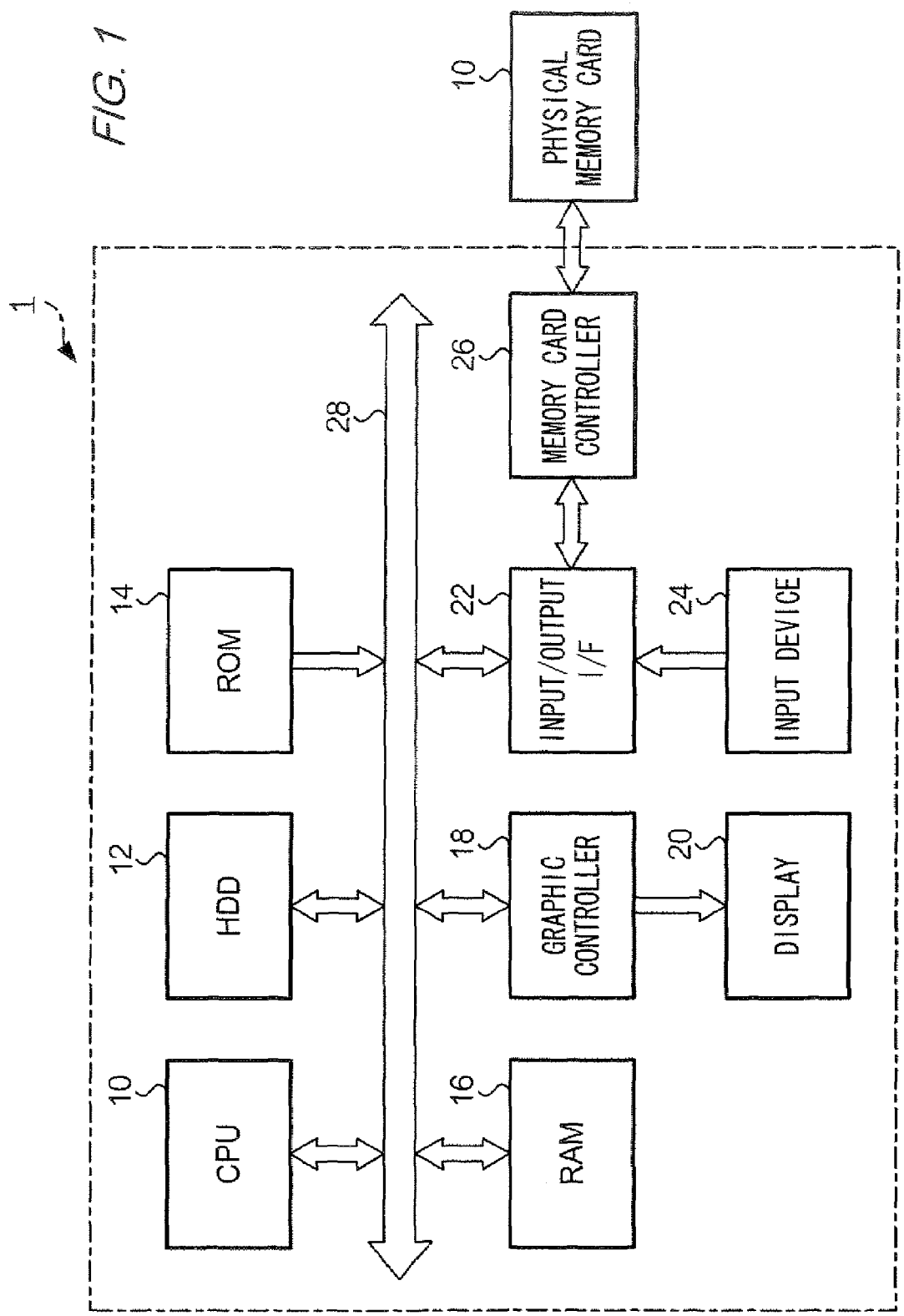
FIG. 1 shows a hardware configuration of an information processing device 1 according to the embodiment of the invention.

FIG. 1 shows a hardware configuration of an information processing device 1 according to an embodiment of the invention. The information processing device 1 is capable of using a memory card as a recording medium. The information processing device 1 includes a CPU (Central Processing Unit) 10, a ROM (Read Only Memory) 14, a RAM (Random Access Memory) 16, a HDD (Hard Disk Drive) 12 as a storage devices a graphic controller 18, and an input/output I/F (Interface) 22. These hardware components are connected so as to be capable of interchanging signals via a bus 28. Note that these hardware components are managed by a BIOS (Basic Input Output System) as basic software, and an operating system (OS) such as WINDOWS (a registered trademark). Under management by these systems, the CPU 10 executes various software including drivers stored in the ROM 14 and HDD 12 and realizes thereby functions described below. The storage device used in the information processing device 1 is not limited to a HDD but may be a different storage device such as a flash memory.

The CPU 10 is a control device which controls respective units of the information processing device 1. The HDD 12 is a storage device which stores data and programs. The ROM 14 is another storage device which stores programs and data necessary for startup of the information processing device 1. The RAM 16 is further another storage device which functions as a work area when the CPU 10 executes a program. A display 20 is a display device which displays texts and images. The CPU 10 reads basic software, various programs such as device drivers for connected peripheral devices, and various data from the ROM 14 and HDD 12. The CPU 10 expands read programs and data over a main memory area provided in the RAM 16 to execute the programs and data. The graphic controller 18 works to display images on the display 20 in accordance with instructions from the CPU 10.

To the input/output I/F 22, an input device 24, a memory controller 26, and other peripheral devices (not shown in the figures) are connected. These devices are connected in accordance with predetermined standards such as the USB (Universal Serial Bus) standard and the IEEE 1394 standard. The input device 24 includes, for example, a keyboard, mouse, and a touch panel or buttons. The memory card controller 26 controls interchange of data between a physical memory card 30 and the information processing device 1. The physical memory card 30 is attachable/detachable to/from the information processing device 1. The memory card controller 26 includes an interface which makes the physical memory card 30 physically attachable/detachable to/from the information processing device 1. The memory card controller 26 may output a signal indicating that the physical memory card 30 is now attached to the information processing device 1. The physical memory card 30 has an identification code such as an ID (Identification) number. Any recording medium may be used as the physical memory card 30 as far as the recording medium enables individual recognition. Specifically, a SD memory card (a registered trademark), SmartMedia having an ID function, or the like is used as the physical memory card 30.

Figure 2:
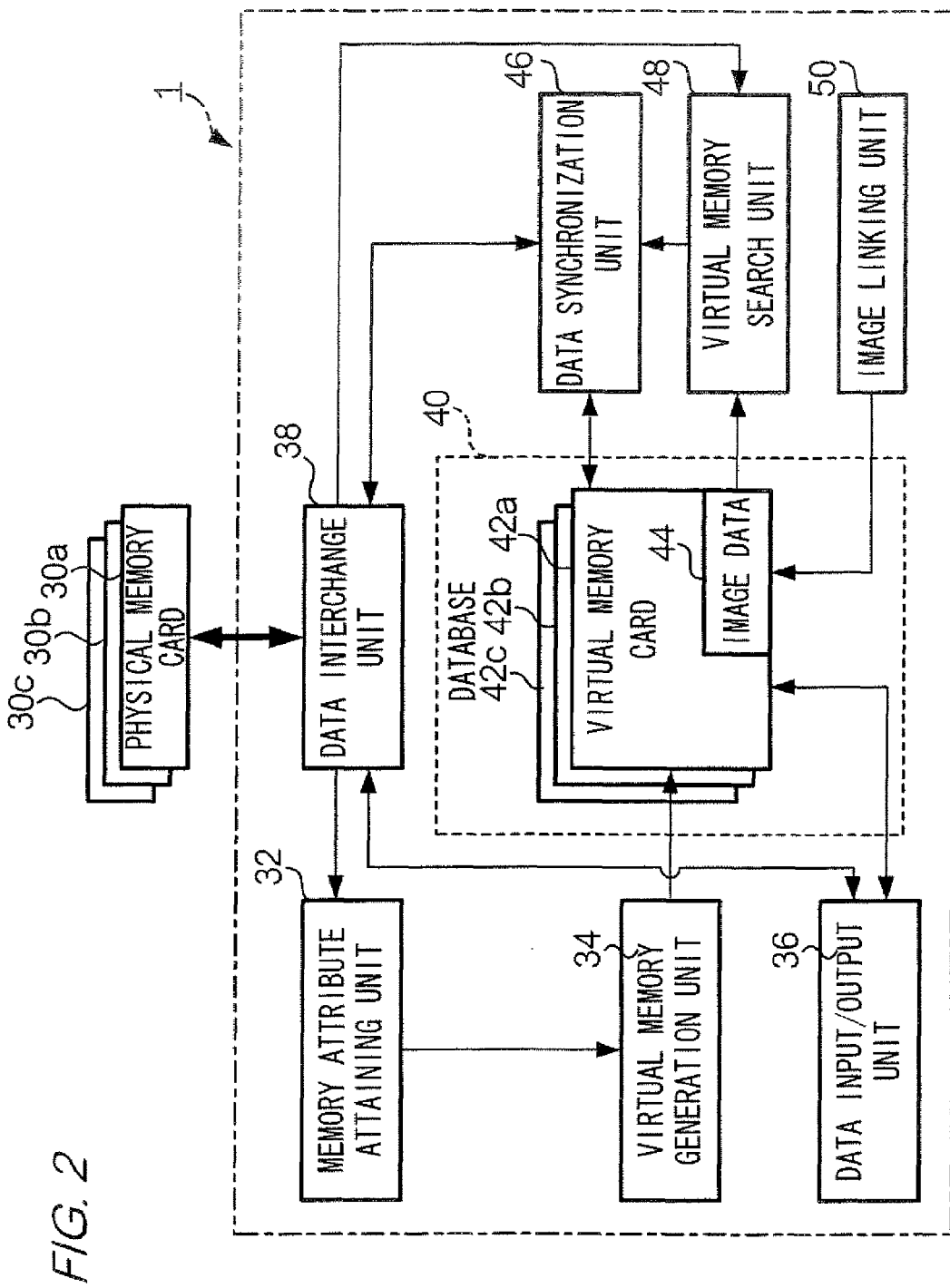
FIG. 2 is a block diagram showing a configuration of functions of the information processing device 1.

FIG. 2 is a block diagram showing a configuration of functions of the information processing device 1. The information processing device 1 has a data interchange unit 38, memory attribute attaining unit 32, virtual memory generation unit 34, data input/output unit 36, database 40, data synchronization unit 46, virtual memory search unit 48, and image linking unit 50.

The data interchange unit 38 and the physical memory card 30 interchange data between each other. The memory attribute attaining unit 32 attains attribute information concerning attribute of the physical memory card 30. The attribute information includes data about the physical memory card 30, e.g., a block size, the maximum number of blocks, maximum capacity, a vender ID, a product ID, a card ID, a product revision, and a file information table. The memory attribute attaining unit 32 sends the attained attribute information to the virtual memory generation unit 34. The virtual memory generation unit 34 generates a virtual memory card 42 on the basis of the attribute information. The "virtual memory card" means a storage area set in the HDD 12 and has the same storage capacity and data configuration as those of the physical memory card 30. A simple name of "memory card" is used to describe articles which apply to both the physical memory card and the virtual. The memory attribute attaining unit 32 attains the ID of the physical memory card 30 by way of the data interchange unit 38. Any information can be used as the ID of the physical memory card 30 as far as the information is capable of uniquely specifying the physical memory card 30. The virtual memory generation unit 34 uses this ID to generate a virtual memory card. More specifically, the virtual memory card 42 and the ID of the physical memory card 30 are stored in the HDD 12 so as to be able to have a one-to-one correspondence, respectively. In this manner, the information processing device 1 is able to make the physical and virtual memory cards correspond uniquely to one another.

Based on the attribute information sent from the memory attribute attaining unit 32, the virtual memory generation unit 34 generates a virtual storage region having substantially the same attributes as those of the attribute information, i.e., a virtual memory card. The virtual memory card has the same data configuration as a corresponding physical memory card. The "data configuration" is a concept a scope of which includes a hierarchical structure such as a relationship between folders or between folders and files in the folders. The virtual memory card 42 is generated in a predetermined region in the database 40 established in the HDD 12. A virtual memory card 42 is generated so as to correspond to each physical memory card 30. That is, the database 40 may include virtual memory cards 42 corresponding to plural physical memory cards 30. For example, virtual memory cards 42a, 42b, 42c, . . . are generated as virtual memories respectively corresponding to physical memory cards 30a, 30b, 30c, . . . In the description below, a suffix to a reference numeral is given to express one particular memory card distinguished from others among plural physical memory cards, e.g., physical memory cards 30a, 30b, 30c, . . . . Particularly when individual physical memory cards need not be distinguished from one another, the physical memory cards are simply referred to as physical memory cards 30. Virtual memory cards are also expressed in the same manner. A virtual memory card 42 may not be created for a physical memory card 30 specified by an instruction from a user.

When a physical memory card 30 is in a mount state, the data input/output unit 36 inputs/outputs data to/from the physical memory card 30. The "mount state" means a state in which a physical memory card 30 is attached to the information processing device 1 and the information processing device 1 can access the physical memory card 30. Otherwise, when the physical memory card 30 is in an unmount state, the data input/output unit 36 input/outputs data to/from a virtual memory card 42. The "unmount state" means a state in which a physical memory card 30 is not attached to the information processing device 1 and the information processing device 1 cannot access physical memory card 30. Also, the physical memory card 30 and the virtual memory card 42 each have an availability flag. The availability flag indicates whether the information processing device 1 can access the memory card or not. For example, if the availability flag of a virtual memory card 42 indicates "unavailable", the information processing device 1 can neither input data to nor output data from the virtual memory card. The availability flag is stored in, for example, the HDD 12.

Data recorded in the physical memory card 30 or virtual memory card 42 is displayed on the display 20, for example, as a user carries out a predetermined manipulation. By a mouse or keyboard, the user can instruct the information processing device 1 to input data, move data from another device, and so on.

Once a physical memory card 30 is attached, the virtual memory search unit 48 searches the database 40 for a virtual memory card 42 corresponding to the attached physical memory card 30. Alternatively, after confirming that data has become interchangeable, the virtual memory search unit 48 may search for a virtual memory card 42 corresponding to a physical memory card 30. Correspondence between the physical memory card 30 and the virtual memory card 42 is determined on the basis of IDs of both cards. For example, if the IDs of both cards coincide with one another, the physical memory card 30 and the virtual memory card 42 are determined to correspond to one another. If a virtual memory card 42 is found to correspond to the physical memory card 30, information indicating it is sent to the data synchronization unit 46.

On the basis of information from the virtual memory search unit 48, the data synchronization unit synchronizes data recorded on the physical memory card 30 with data recorded on the virtual memory card 42. Information items dependent on physical memory cards, such as block sizes and addresses are switched appropriately when synchronizing data. The term "synchronize" as used here means that at least a part of one of the physical memory card 30 and the virtual memory card 42 (hereinafter a "synchronization source") is synchronized with the contents of storage of the other one (hereinafter a "synchronization destination"). Various methods can be used as a synchronization method thereof. For example, whether the physical memory or the virtual memory is set as a synchronization source or a synchronization destination may be predetermined. Alternatively, a device which stores data having a newer time stamp added may be set as the synchronization source, and data having an older time stamp added may be set as the synchronization destination. As a further alternative, the synchronization source and the synchronization destination may be determined on the basis of an instruction from a user. Targets to be synchronized need not always be all the data stored in memory cards but may be a part of the data.

An image linking unit 50 determines image data corresponding to the virtual memory card 42. To the image data, an identifier specifying a virtual memory card and a physical memory card is linked. For example, image data corresponding to a virtual memory card 42 is selected from plural image data items stored in advance in the HDD 12 or the like. Selection is carried out by a user. Alternatively, image data may be automatically selected in accordance with an algorithm predetermined by the information processing device 1. The selected image data item is stored as image data 44 in a predetermined region in the virtual memory card 42. Alternatively, the image data may be stored as image data 44 in another region in the virtual memory card 42 such that the image data has a one-to-one correspondence with virtual memory card. The virtual memory card and the image data may be stored in one physically identical storage device (e.g., the HDD 12). Alternatively, the virtual memory card and the image data may be stored in physically different storage devices (e.g., the HDD 12 and the ROM 14).

Components constituting respective functions of the information processing device 1 have been described above. These functions that are realized as hardware resources described above work in integral cooperation with software.

2. Operation of the Information Processing Device 1

2-1. Main Processing Flow

Figure 3:
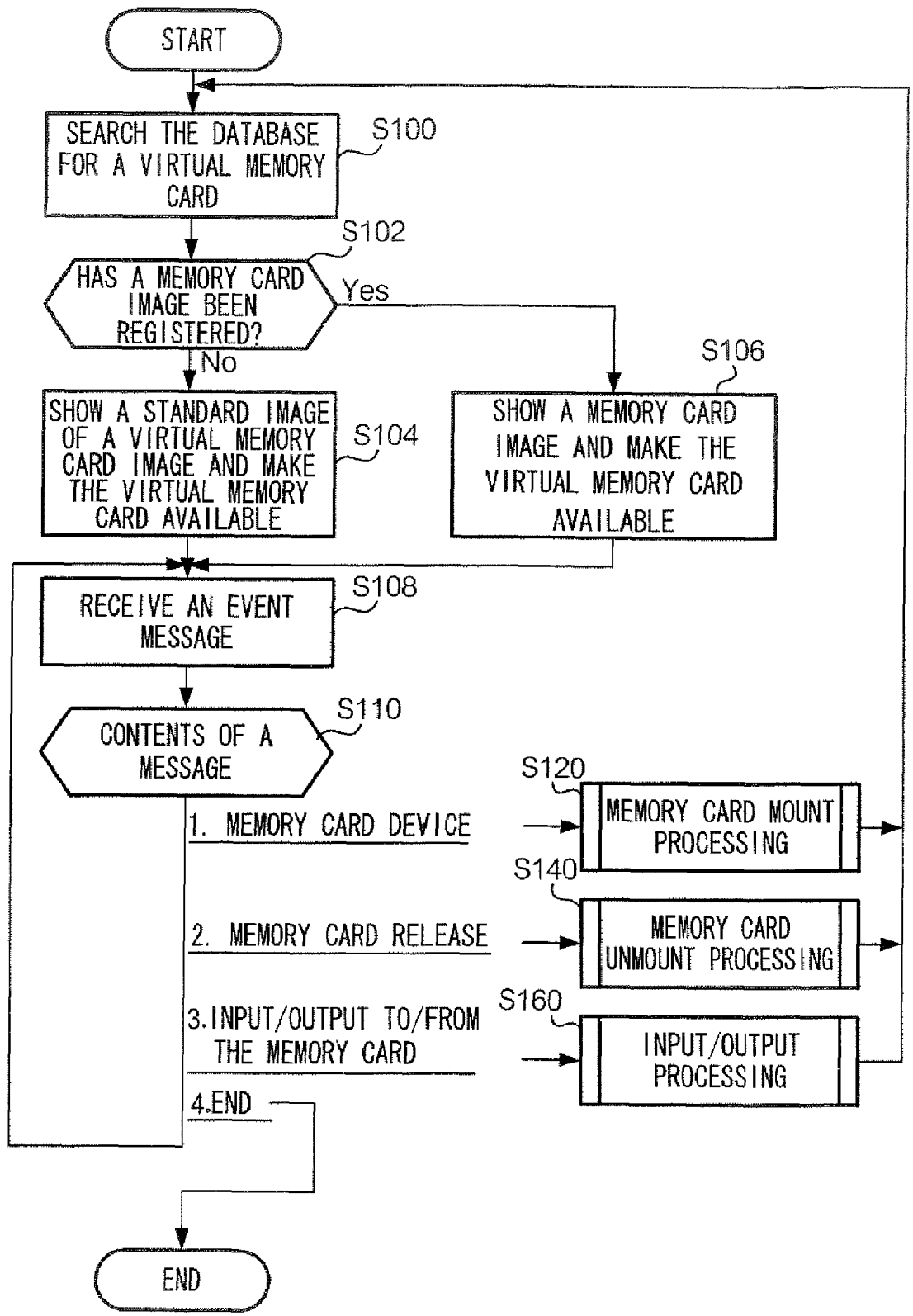
FIG. 3 is a flowchart showing operation of the information processing device 1.

FIG. 3 shows the entire processing of an information processing program which drives the information processing device 1. In step S100, the CPU 10 searches the database 40 for a virtual memory card 42 the availability flag of which indicates "available". If plural virtual memory cards 42 the availability flags of which indicate "available" are registered in the database 40, the CPU 10 specifies virtual memory cards to be processed, orderly one after another. The CPU 10 performs processing described below on each virtual memory card to be processed. Description will now be made of an example in which a virtual memory card 42a is the memory card to be processed.

Next, the CPU 10 determines whether image data 44a corresponding to the virtual memory card 42a has been registered or not (step S102). If the corresponding image data 44a has been registered (S102: Yes), the CPU 10 functions to display an image expressed by the data 44a on the display 20 (step S106). Thus, a user is informed of the virtual memory card 42a being available now.

Figure 6A:
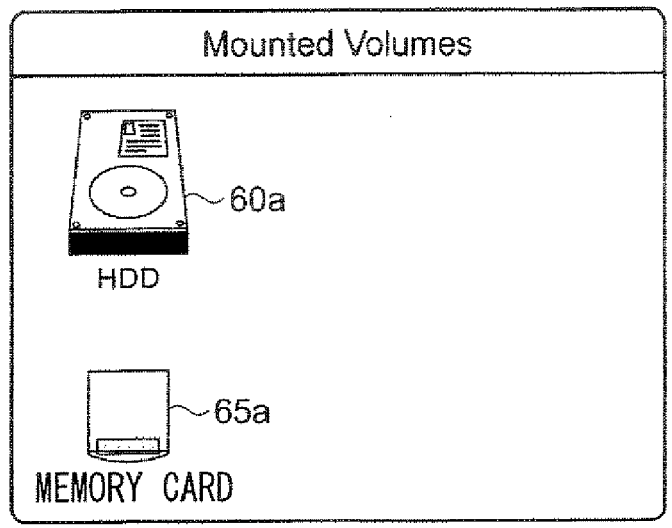
FIG. 6 show examples of screens displayed on a display 20.
Figure 6B:
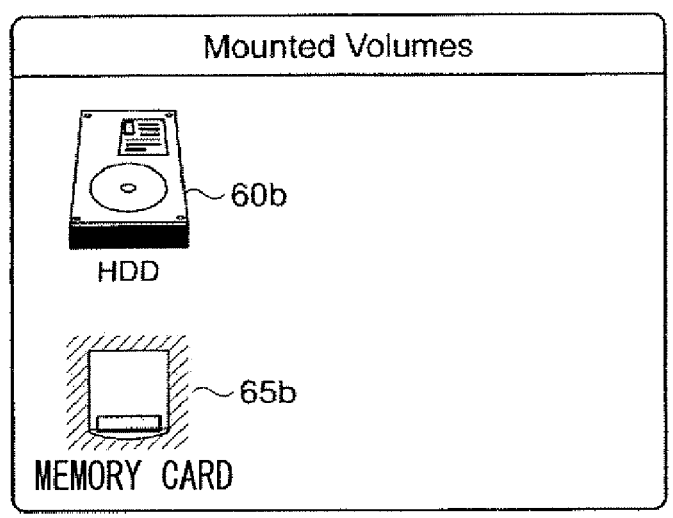

FIGS. 6A and 6B show examples of screens showing devices mounted on the information processing device 1. The example of FIG. 6A shows an image 60b indicative of a HDD 12 and an image 65a indicative of an attached physical memory card 30a. The example of FIG. 6B shows an image 60a indicative of a HDD 12 and an image 65b indicative of a virtual memory card 42a. The image 65b indicative of a virtual memory card 42a is, for example, an image having a background color changed from that of the image 65a indicative of a physical memory card 30a. The image 65b is stored as image data 44a linked with a virtual memory card 42a. If plural virtual memory cards 42 the availability flags of which indicate "available" have been registered, plural images are displayed. Each of the plural images includes information capable of specifying uniquely a memory card. Also, each of the plural images may include information indicative of whether the memory card is a virtual or physical memory card.

Description will now be made referring again to FIG. 3. If no corresponding image data 44a has been registered (S102: No), the CPU 10 works to display an icon on the display 20 (step S104). The icon has been prepared by a function of the OS. Thus, the user is informed of a virtual memory card being used.

In the step S108, the CPU 10 receives an event message which is sent on the basis of a function of the OS. This is an event driven program which executes a corresponding process in accordance with an event message supplied from the OS.

If an event message is received, the CPU 10 reads the content of the received event message (step S110). For example, if the content of an event message is indicative of mounting of a physical memory card 30 (S110: 1), the CPU 10 executes a memory card mount processing (step S120). Upon completion of the memory card mount processing, the CPU 10 shifts the processing again to the step S100. Note that details of the mount processing will be described later. The message indicative of mounting of a memory card may be generated upon physical attachment of the memory card to the information processing device 1. Alternatively, the message indicative of mounting of a memory card may be generated based on an instruction from a user.

If the content of an event message is indicative of unmounting of a physical memory card 30 (S110: 2), the CPU 10 executes a memory card unmount processing (step S140). Upon execution of the memory card unmount processing, the CPU 1 shifts the processing again to the step S100. Details of the memory card unmount processing will be described later. The event message indicative of unmounting of a memory card may be generated, for example, upon detachment of a physical memory card 30 from the information processing device 1. Alternatively, an event message indicative of unmounting of a memory card may be generated based on an instruction from a user.

If the content of an event message is indicative of input/output of data to/from a memory card (S110: 3), the CPU 10 executes reading data from or writing of data into a specified memory card. Upon execution of input/output of data, an image indicative of a memory card may be changed to another image indicating that data has been changed.

If the content of an event message is indicative of completion of a program (step S110: 4), the CPU 10 terminates the processing shown in FIG. 3. Otherwise, if the content of an event message fits none of cases described above (steps S110: 1 to 4), the CPU 10 shifts the processing to the step S108.

Figure 6C:
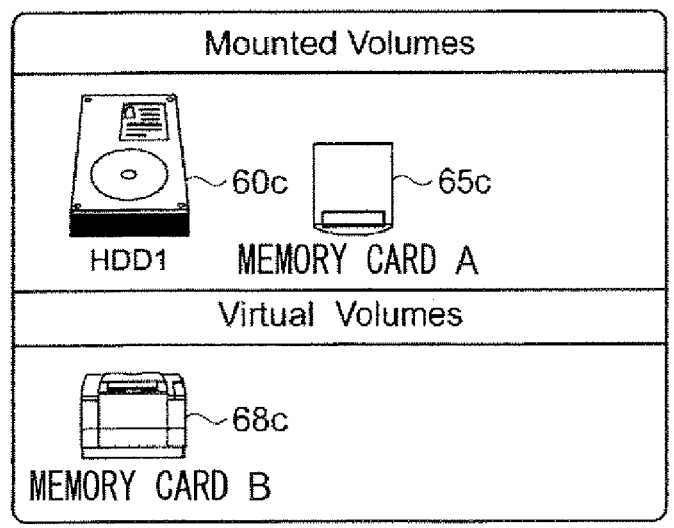

In each of FIGS. 6A and 6B, an image of a physical memory card or an image of a virtual memory card and an image indicative of the HDD 12 are shown in the same area. In FIG. 6A, a physical memory card and the HDD 12 are both existing storage devices connected to an information processing device and are rendered available. In FIG. 6B, an image of a virtual memory card is shown using in a different background color from an image of a physical memory card to clarify the difference from the physical memory card. Besides, the image of the virtual memory card and the image indicative of the HDD 12 are shown in the same area. However, as shown in FIG. 6C, a physical memory card and the HDD 12 which are directly accessible to existing storage devices may be shown in a different area partitioned from an area for a virtual memory card which indirectly accesses an existing storage device. In the example of FIG. 6C, images are displayed, divided into an existing drive region (Virtual Volumes) and a virtual drive region (Virtual Volumes). An image 60*c* indicative of the HDD 12 and an image 65*c* indicative of a physical memory card (ID: A) are displayed in the existing drive region. An image 68*c* indicative of a memory card (ID: B) indicative of a virtual memory card is displayed in a virtual drive region. The information processing device 1 is able to display detailed information of data recorded on each device in accordance with manipulation by a user. For example, as the user selects images (60, 65, and 68) of various devices shown in FIGS. 6A to 6C with use of a mouse or the like, detailed information of data recorded in the selected device can be displayed.

2-2. Memory Card Mount Processing

Figure 4:
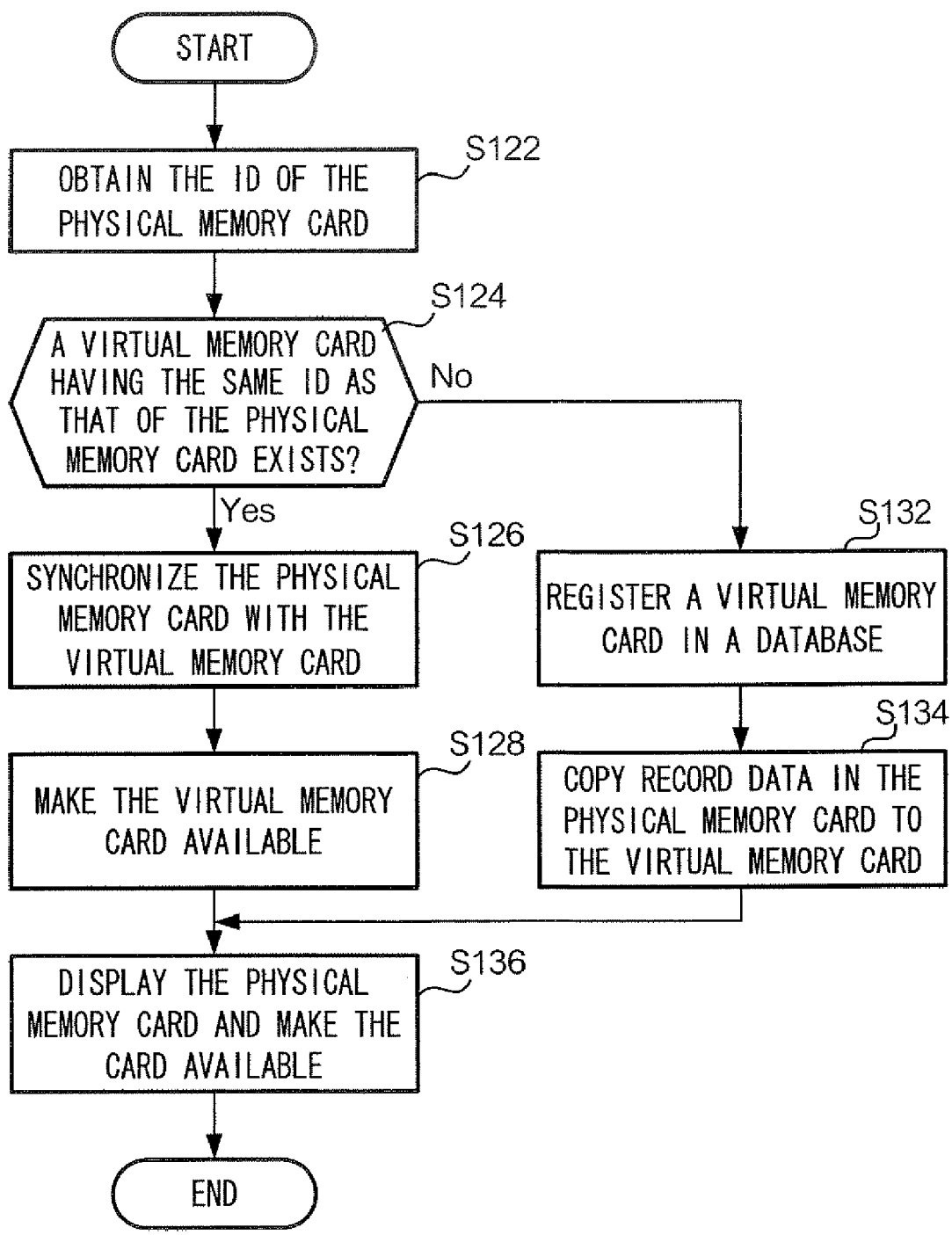
FIG. 4 is a flowchart showing details of memory card mount processing.

FIG. 4 is a flowchart showing details of the memory card mount processing. Description will now be made of an example in which a physical memory card 30*a* is attached.

In the step S122, the CPU 10 obtains the ID of the physical memory card 30*a*. More specifically, the CPU 10 obtains attribute information of the physical memory card 30*a*. The CPU 10 extracts the ID of the physical memory card 30*a* from the obtained attribute information.

Next, the CPU 10 determines whether a virtual memory card (virtual memory card 42*a*) having the same ID as the physical memory card 30*a* exists in the database 40 (step S124).

If it is determined that a virtual memory card having the same ID exists (S124: Yes), the CPU 10 synchronizes recorded data in the physical memory card 30*a* with recorded data in the virtual memory card 42*a* (step S126). Next, the CPU 10 transfers the virtual memory card 42*a* to an unavailable state (step S128). That is, the CPU 10 overwrites the availability flag of the virtual memory card 42*a* with "unavailable". As a result, the image 65*b* shown in FIG. 6B is not displayed any more. Besides, input/output of data to/from the virtual memory card 42*a* becomes impossible, i.e., access to the virtual memory card 42*a* is inhibited. That is, the CPU 10 overwrites the availability flag of the physical memory card 30*a* with "available". The CPU 10 also makes the display 20 to display an image indicating that the physical memory card 30*a* is now available. After the physical memory card 30*a* is rendered available, the CPU 10 terminates the processing shown in FIG. 4. As a result of this, an image 65*a* indicative of the physical memory card 30*a* is shown on the display 20, as shown in FIG. 6A. Thus, input/output of data to/from the physical memory card 30*a* is enabled.

Otherwise, if it is determined that no virtual memory card having the same ID exists (S124: No), the CPU 10 generates a new virtual memory card (virtual memory card 42*a*) (step S132). The new virtual memory card 42*a* has substantially the same attributes including an ID as those of the physical memory card 30*a*. In other words, the virtual memory card 42*a* has the same is data configuration as the physical memory card 30*a*. Subsequently, the CPU 10 copies data recorded on the physical memory card 30*a* to the virtual memory card 42*a* (step S136). That is, the CPU 10 overwrites the availability flag with "available". After the physical memory card 30*a* is rendered available, the CPU 10 terminates the processing shown in FIG. 4.

2-3. Memory Card Unmount Processing

FIG. 5 is a flowchart showing details of the memory card unmount processing. Description will be made below of an example in which the a physical memory card 30*a* is attached. In the step S142, the CPU 10 copies information of a physical memory card 30*a* to a corresponding virtual memory card 42*a* (step S142). That is, the database 40 reflects the information of the physical memory card 30*a*.

Next, the CPU 10 transfers the physical memory card 30*a* into an unusable state (step S144). That is, the CPU 10 overwrites the availability flag of the physical memory card 30*a* with "unavailable". The CPU 10 makes the display 20 show a message indicating that the physical memory card 30*a* is now detachable. In response to this message, the user detaches the physical memory card 30*a* from the information processing device 1. After the availability flag changes to "unavailable" or after the physical memory card 30*a* is physically detached from the information processing device 1, the image 65*a* (in FIG. 6A) of a memory card representing the physical memory card 30a is not displayed any more on the display 20.

Subsequently, the CPU 10 searches the database 40 for a virtual memory card 42 corresponding to the physical memory card 30a changed into an unavailable state, i.e., for a virtual memory card 42a which has the same ID as the physical memory card 30a.

Next, the CPU 10 determines whether image data 44a corresponding to a detected virtual memory card 42a has been registered or not (step S148). If it is determined that the image data 44a has been registered (S148: Yes), the CPU works to display on the display 20 an image in accordance with registered image data. Also, the CPU 10 overwrites the availability flag of the virtual memory card 42a with "available". Thus, the user is informed of the virtual memory card 42a being available. After a registered image is displayed on the display 20, the CPU 10 terminates the processing shown in FIG. 5.

If it is determined that the image data 44a has not been registered (S148: No), the CPU 10 works to display a standard icon or the like appended to the OS as an image representing a virtual memory card on the display 20 (step S150). Also, the CPU 10 overwrites the availability flag of the virtual memory card 42 with "available". Thus, the user is informed that the virtual memory card 42a is available. After the image is displayed on the display 20, the CPU 10 terminates the processing shown in FIG. 5.

Data interchanged while the physical memory card 30a is not attached is subjected to synchronization according to predetermined rules by the processing according to the information processing program as described above. This synchronization starts independently from a user's manipulation. Therefore, the user can always use data as if a physical memory card 30 is attached to the information processing device 1 regardless of whether the physical memory card 30 is attached or not.

3. Further Embodiments

An embodiment of the invention has been described above. The invention, however, is not limited to this embodiment but may be subject to a variety of modifications in practice.

(1) An image in which the image linking unit 50 links to a virtual memory card 42 is not limited to an image prestored in the information processing device 1. For example, this image may be generated from an outer appearance of the physical memory card 30. That is, an image such as a label of a physical memory card 30 picked up by a scanner or CCD (Charge Coupled Device) camera may be adopted as an image representing a memory card.

(2) In the embodiment described above, one single device has the hardware configuration shown in FIG. 1 and the functional configuration shown in FIG. 2. However, a system including plural devices may as a whole have the hardware configuration shown in FIG. 1 and the functional configuration shown in FIG. 2. For example, a system including an information processing device and a portable information terminal connected to an information communication terminal may have the functions described above. In this case, for example, the portable information terminal may have the function to interchange information of the physical memory card 30.

(3) Interchange of data between a recording medium and an information processing device is not limited to a method based on electric contact. Another method in which light, an electromagnetic wave such as an electric wave, or a sound wave acts as a medium may be used. Alternatively, a contactless information interchange method using electromagnetic induction may be used.

(4) The above embodiment uses a physical memory card 30 as a recording medium. Further, the information processing device 1 has a memory card controller 26 to control the physical memory card 30, However, the recording medium may be a recording medium which is connected directly to the input/output I/F 22. For example, a flash memory or a USB memory having a flash memory controller and a USB interface may be used as the recording medium. In this case, the production number (serial number) of a product may be used as the ID of the recording medium.

(5) In the above embodiment, images each symbolizing a physical or virtual memory card are displayed on the display 20. These images may be changed in accordance with changes in the state of the physical or virtual memory card. For example, suppose a case that writing into a virtual memory card is carried out in a state in which a physical memory card is unmounted and a virtual memory card is mounted. In this case, there is a high possibility that data in the physical memory card and data in the virtual memory card will disagree with each other. When a particular condition is satisfied, the CPU 10 may work to show on the display 20 an image indicating the possibility of disagreement in data between the physical memory card and the virtual memory card. For example, a prestored image may be displayed so as to overlap an image indicative of a memory card.

(6) In the embodiment described above, the information processing device 1 has an interface to which one single physical memory card is attachable. The information processing device 1, however, may have an interface to which plural physical memory cards are attachable.

What is claimed is:

1. An information processing device comprising:
   an interface to/from which a recording medium is attachable/detachable;
   a data storage device that stores data of a plurality of recording media;
   a data extractor that extracts data recorded on the recording medium connected through the interface, with the data maintained in a data configuration of the recording medium;
   a controller that controls the data storage device to store the data extracted by the data extractor together with an identifier which specifies the recording medium, with the data maintained in the data configuration extracted;
   a data synchronizer that synchronizes at least part of data in the recording medium connected through the interface, with at least part of data that corresponds to the storage medium among data stored in the data storage device;
   an image storage device that stores image data showing a plurality of images, linked to each of the plurality of recording media, to the identifier specifying the recording medium, and to a status of the recording medium; and
   a display that displays a plurality of images linked to the plurality of recording media, in accordance with the image data stored in the image storage device, the displayed image depending on the status of the recording medium.

2. The information processing device according to claim 1, further comprising
   a data synchronizer that synchronizes at least part of data that corresponds to the storage medium among data stored in the data storage device, with at least part of data in one of the plurality of the recording media connected through the interface.

3. The information processing device according to claim 1, further comprising
an image updater that updates the image data that corresponds to the recording medium connected through the interface among the image data stored in the image storage device, to image data indicating that the recording medium is now attached.

4. The information processing device according to claim 1, wherein the recording medium is a card type recording medium.

5. A data processing method for an information processing device having an interface to/from which a recording medium is attachable/detachable, a data storage device that stores data, and a display that displays an image, the method comprising:
   extracting data recorded on the recording medium connected through the interface, with the data maintained in a data configuration of the recording medium;
   controlling the data storage device so as to store the extracted data together with an identifier specifying the recording medium, with the data maintained in the data configuration extracted;
   synchronizing at least part of data in the recording medium connected through the interface, with at least part of data that corresponds to the storage medium among data stored in the data storage device;
   controlling the data storage device to store image data showing a plurality of images, linked to each of the plurality of recording media, to the identifier specifying the recording medium, and to a status of the recording medium; and
   displaying on the display, a plurality of images linked to the plurality of recording media, in accordance with the stored image data, the displayed image depending on the status of the recording medium.

6. A recording medium storing a program causing an information processing device to execute a process, the information processing device having an interface to/from which a recording medium is attachable/detachable, a data storage device for storing data, and a display that displays an image, the progress comprising:
   extracting data recorded on the recording medium connected through the interface, with the data maintained in a data configuration of the recording medium;
   controlling the data storage device so as to store the extracted data together with an identifier specifying the recording medium, with the data maintained in the data configuration extracted;
   synchronizing at least part of data in the recording medium connected through the interface, with at least part of data that corresponds to the storage medium among data stored in the data storage device;
   controlling the data storage device to store image data showing a plurality of images, linked to each of the plurality of recording media, to the identifier specifying the recording medium, and to a status of the recording medium; and
   displaying on the display, a plurality of images linked to the plurality of recording media, in accordance with the stored image data, the displayed image depending on the status of the recording medium.

* * * * *